March 13, 1951 F. KUHN ET AL 2,545,288
TIMING SWITCH FOR ELECTRIC TOASTERS
Filed March 3, 1947 3 Sheets-Sheet 1

INVENTORS
FRANK KUHN
LAURENCE H. THOMAS
BY
*Whittemore Hulbert & Belknap*
ATTORNEYS March 13, 1951  F. KUHN ET AL  2,545,288
TIMING SWITCH FOR ELECTRIC TOASTERS
Filed March 3, 1947  3 Sheets-Sheet 3

INVENTORS
FRANK KUHN
BY LAURENCE H. THOMAS
Whittemore Hulbert & Belknap
ATTORNEYS Patented Mar. 13, 1951

2,545,288

UNITED STATES PATENT OFFICE 2,545,288

TIMING SWITCH FOR ELECTRIC TOASTERS

Frank Kuhn, Detroit, and Laurence H. Thomas, Birmingham, Mich., assignors to American Electrical Heater Company, Detroit, Mich., a corporation of Michigan Application March 3, 1947, Serial No. 731,924

5 Claims. (Cl. 175—320)

1

The invention relates to timing means for circuit controlling electric switches, more particularly designed for use in connection with electric toasters. It is the object of the invention, first to obtain a construction which is largely electrical in its operation as distinguished from pure mechanism; second, to obtain a construction which is very accurate in its timing both as originally set and during succeeding operations. With these objects in view, the invention consists in the construction as hereinafter set forth.

Figure 1:
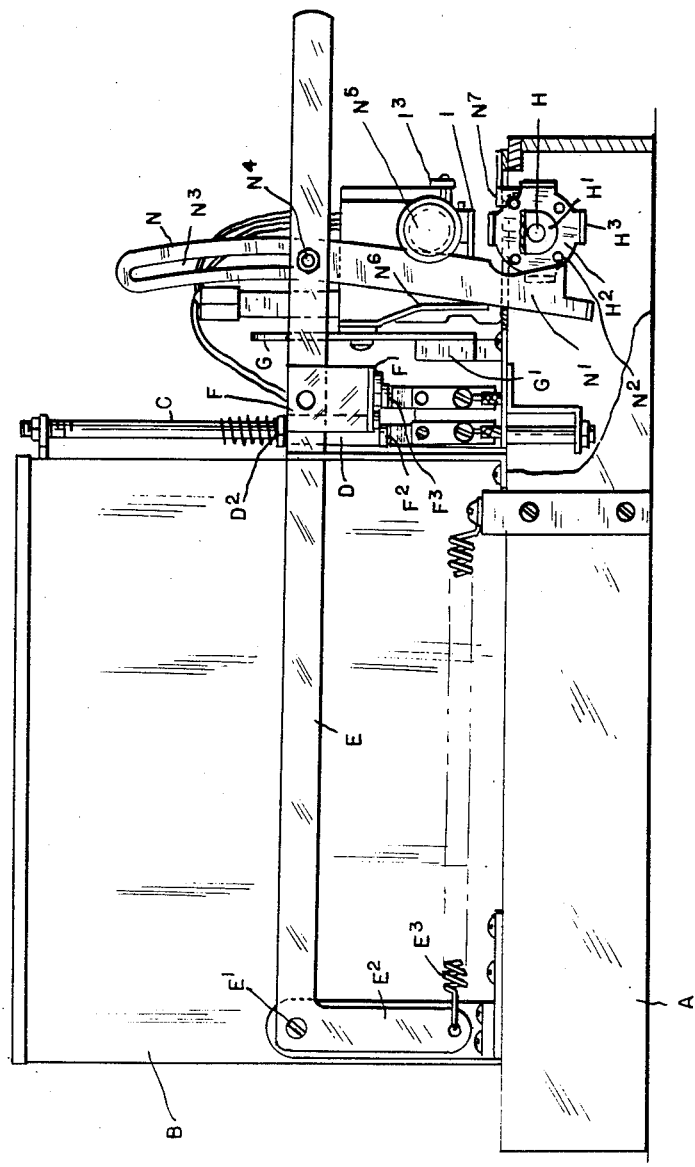
Fig. 1 is a side elevation of an electric toaster provided with my improved circuit controlling timing means, and with the outer casing thereof removed.
Figure 2:
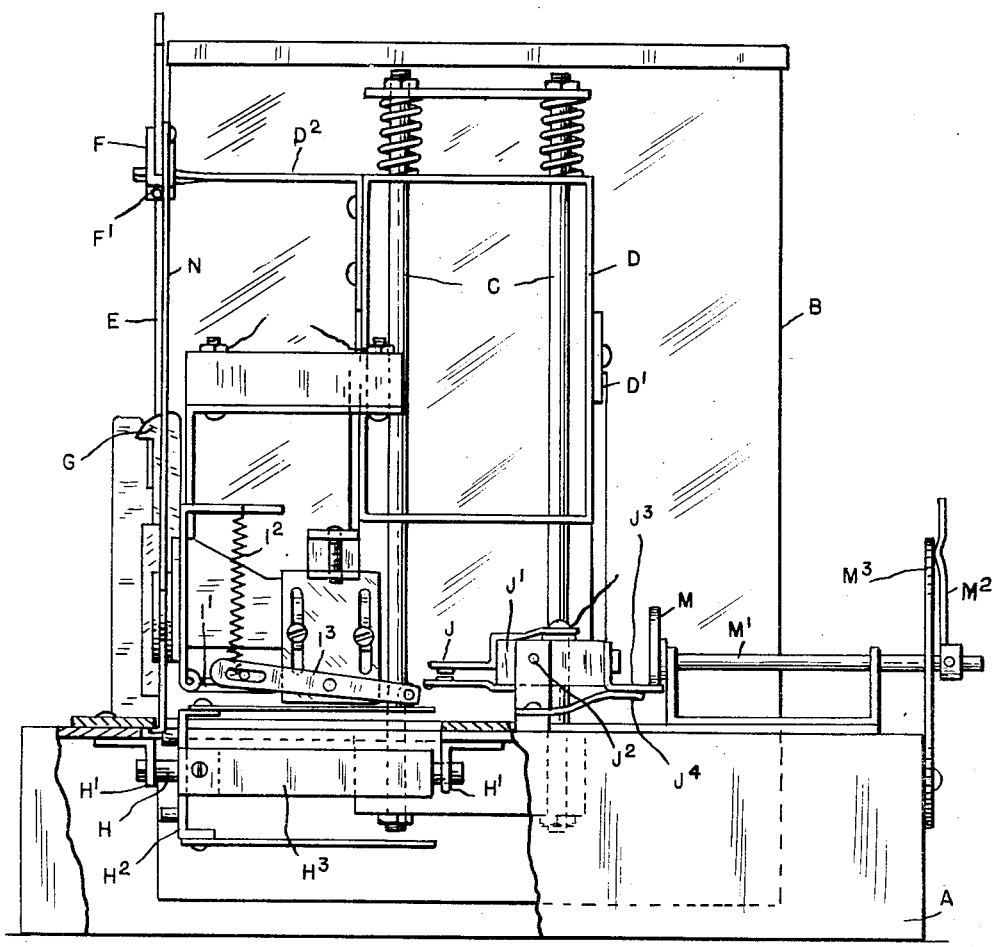
Fig. 2 is an end elevation thereof.
Figure 3:
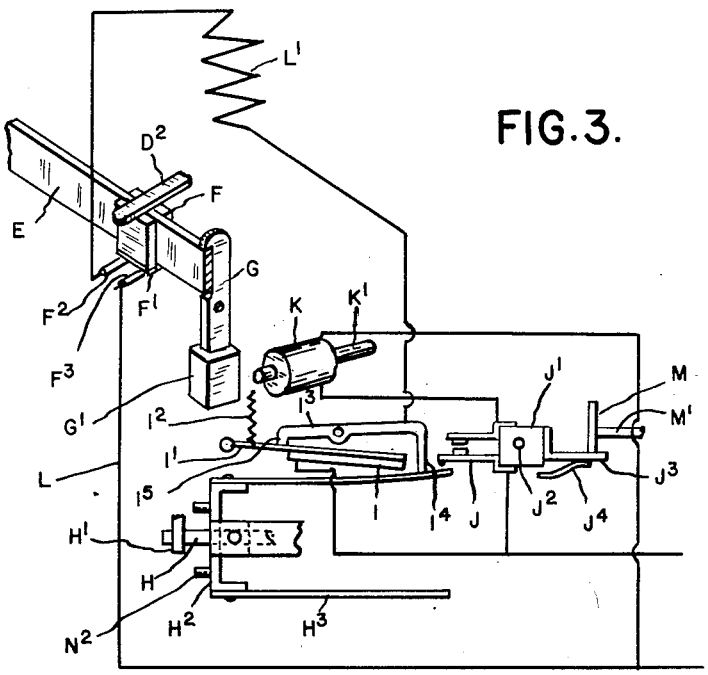
Fig. 3 is a diagram illustrating the operation.
Figure 4:
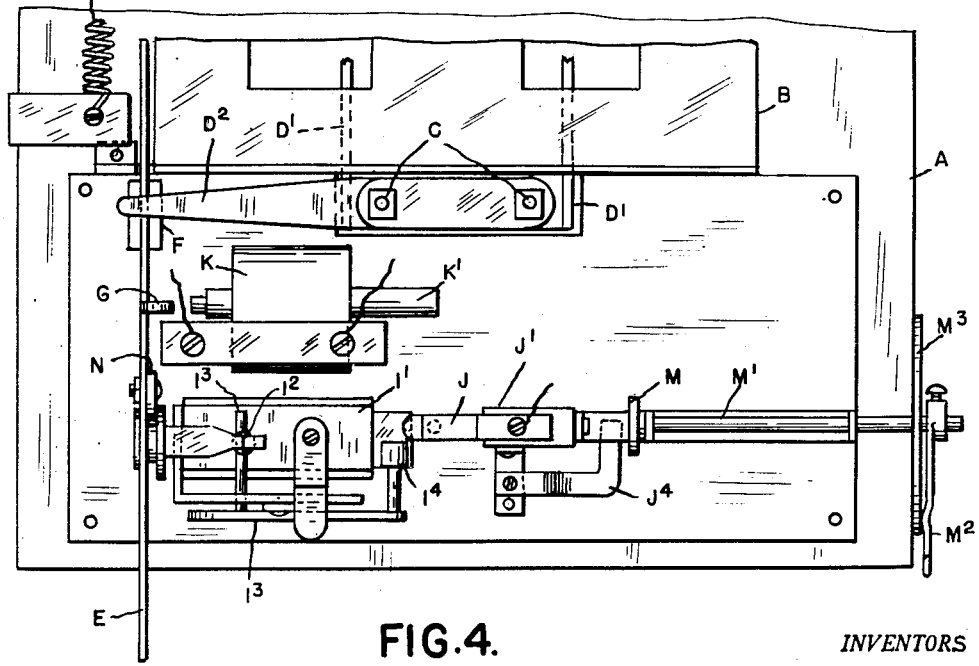
Fig. 4 is a plan view.

The toaster proper may be of any suitable construction but as shown it is provided with a hollow base portion A upon which is mounted a casing B for enclosing the heating units. At one end of the casing B are arranged guide posts C for a carriage D, which carriage has arms D' extending through slots in the end of the casing to support the bread holders (not shown). At the side of the casing B is a lever E shown as a bellcrank lever pivoted at E' and having the short arm E² thereof connected to a spring E³. This spring has its opposite end anchored to the base and is tensioned so as to normally hold the lever in raised position. The carriage D is also yieldably held in raised position by the spring E³ through the medium of an arm D² extending laterally from said carriage and above the lever E. The lever E has also mounted thereon an insulator block F which carries a contact member F' for bridging between a pair of cooperating contacts F² and F³ when the lever E is depressed. This, as will be later described, closes the energizing circuit through the heating element of the toaster and also lowers the carriage D and bread carrier connected therewith. The lever E is held in depressed position by a pivotal latch member G which automatically engages therewith. Thus, as long as this latch member remains in engagement the bread carrier will be lowered and the heaters energized.

Timing means

The releasing of the pivotal latch member G is effected by automatic timing means of the following construction. H is a shaft journaled

2 in brackets H' located within the hollow base A. H² is a head mounted on the shaft H and having secured thereto a plurality of bi-metal thermostatic bars H³ which extend normally substantially parallel to the shaft. As shown, there are four of these bars, the top one of which is located in proximity to a small electric heating unit I. The latter is mounted on a pivoted arm I' so as to normally extend parallel to but spaced from the adjacent bar H³, being held in such position by a spring I² and a centrally pivoted lever I³. The lever I³ has an arm I⁴ at one end thereof extending into contact with the upper face of the bar H³ near its free end. The opposite end of the lever I³ has an arm I⁵ extending over the arm I'. The construction is such that the heat radiated from the element I when energized will fall upon the bar H³ causing the progressive warping thereof in an upward direction. This upward movement of said bar will through the lever I³ depress the pivoted arm I' carrying downward with it the element I. As this brings it into closer proximity to the bar H³, the heat absorption of said bar will be continued despite its previous rise in temperature, the total effect being to progressively deflect the bar in successive intervals of time. The release of the latch member or detent G is accomplished by a member actuated by the deflection of the bar H³ and means cooperating therewith. Preferably, the member actuated by the bar H³ is a normally open switch J which controls the energizing circuit of an electromagnet K. This magnet, shown as a solenoid, has its movable core member K' in alignment with a weighted lower end G' of the pivotal latch member G. Thus, when the solenoid is energized the core K' will rock the member G to disengage the latch from the lever E whereupon the spring E³ will actuate the lever E in an upward direction removing the bridge contact F' from the cooperating contacts F² and F³ and also lifting the carriage D to remove the toast from the casing B. The electric circuit L controlled by the contacts F', F² and F³ includes the toasting heaters L' and also the electric heater I which, as shown, is connected in series with said heaters L'. The time interval between the latching of the lever E and the release of the detent G may be varied by mounting the switch J on a movable member which can be adjusted towards or away from the bar H³. As shown, the switch J is mounted on an insulator block J' which is supported on a pivot J². The opposite end of the block J' has projecting therefrom a finger J³ which extends into operative relation to a cam or eccentric M on a rock shaft M' mounted on the base A. The rock shaft M' extends to the side of the base and is provided with a pointer arm M², which may be turned in relation to an indicator segment M³ into different positions of adjustment. A spring J⁴ presses the finger J³ against the cam or eccentric M so that the turning of said cam in one direction will depress the finger J³ and move the switch J' away from the bar H³ while movement of said cam in the opposite direction will through the spring J⁴ tilt the block J' to bring the web closer to the bar H³.

With the construction as thus far described, it will be understood that the pointer M² may be adjusted for any desired timing of the release of the latch member G. Thus whenever the lever E is manually depressed into engagement with said latch member this will close the circuit L energizing the heaters L' and I which will remain in operation until the deflection of the bar H³ will close the switch J. This by energizing the magnet K will release the latch permitting the lever E to move upward under the actuating pressure of the spring E³ opening the circuit L, as well as moving the carriage D to extract the toast. When the lever E is again depressed the operation will be repeated.

In the use of a toaster, it is desirable at times to quickly repeat the toasting operation. However, a thermostatic bi-metal bar such as H³ will take a certain time interval to fully cool so as to be returned to its initial position. Thus if the same bar were used in repeated operations of the toaster, the time of the first operation would be different from that of succeeding operations. Such detrimental effect we have avoided by providing a plurality of the bars H³ which are successively brought into operative relation to the heater I. As shown and as previously described, there are four of these bars distributed around the circumference of the head H². If these bars are used successively in a cycle, the time interval for the full cycle will be sufficient for the complete cooling of each bar before it is reused. We have, therefore, provided means for rotating the head H² through one-quarter of a revolution each time the lever E is depressed. This means includes a link N connected to the lever E and having at its lower end a pawl N' for successively engaging pins N² projecting from the head H². The amount of movement required for rotating the head by a pin N² through one-quarter of a revolution is less than the movement of the lever E and, therefore, a lost motion connection is made between the lever and the link N by a slot N³ in said link engaging a pin N⁴ on the lever. A cam N⁵ deflects the link N laterally during its descent to facilitate the turning of the head H² and a spring N⁶ yieldably presses the link against said cam. N⁷ is a latchdog for holding said head after each rotary adjustment thereof.

The construction as above described is one in which the time interval between the closing of the switch and the opening of the same can be very accurately determined and may be maintained the same in each succeeding operation.

What we claim as our invention is:

1. A manually operable electric circuit closing main switch, a detent operably associated therewith for holding said switch closed, electromagnetic means cooperating with said detent to release the same, a normally open auxiliary switch controlling the energizing and de-energizing of said electromagnetic means, an electric heater energized by the closing of said main switch, a plurality of bi-metal thermostatic bars, a carriage for said bars movable to alternatively operatively position said bars in close relation to both said heater and said auxiliary switch to be gradually deflected toward said heater by the heat therefrom into a position for closing said auxiliary switch thereby releasing said detent and opening said main switch, means operated by the deflection of said thermostatic bar for moving the heater closer to said bar, and means operated by each closing of said main switch for moving said carriage and bringing another of said thermostatic bars into operative position.

2. A manually operable electric circuit closing main switch, a detent operably associated therewith for holding said switch closed, electromagnetic means cooperating with said detent to release the same, a normally open auxiliary switch controlling the energizing and de-energizing of said electromagnetic means, an electric heater energized by the closing of said main switch, a plurality of bi-metal thermostatic bars, a carriage for said bars movable to alternatively operatively position said bars in close relation to both said heater and said auxiliary switch to be gradually deflected toward said heater by the heat therefrom into a position for closing said auxiliary switch thereby releasing said detent and opening said main switch, means operated by the deflection of said thermostatic bar for moving the heater closer to said bar, means operated by each closing of said main switch for moving said carriage and bringing another of said thermostatic bars into operative position, and means for adjusting said auxiliary switch in relation to the operatively positioned thermostatic bar to vary the time that said switch remains closed.

3. A manually operable electric circuit closing main switch, a detent operably associated therewith for holding said switch closed, electromagnetic means cooperating with said detent to release the same, a normally open auxiliary switch controlling the energizing and de-energizing of said electromagnetic means, an electric heater energized by the closing of said main switch, a plurality of bi-metal thermostatic bars alternatively operatively positioned adjacent said auxiliary switch in parallel relation to said heater to be gradually deflected toward said switch and said heater by the heat therefrom, pivotal means engaging said thermostatic bar and operated by the initial deflection of the latter for moving said heater closer to said bar to increase the range of deflection thereof, means for adjusting said auxiliary switch in relation to said thermostatic bar to be closed thereby after different timing intervals thereby releasing said detent and opening said main switch, and means operated by each closing of said main switch for bringing another of said thermostatic bars into operative position.

4. A manually operable electric circuit closing main switch, a detent operably associated therewith for holding said switch closed, electromagnetic means cooperating with said detent to release the same, a normally open auxiliary switch controlling the energizing and de-energizing of said electromagnetic means, an electric heater energized by the closing of said main switch, a rotary carrier, a series of bi-metal thermostatic bars mounted on said carrier with one of said bars operatively positioned adjacent said auxiliary switch in parallel relation to said heater to be gradually deflected toward said switch and said heater by the heat therefrom into a position for closing said auxiliary switch thereby releasing said detent and opening said main switch, means operated by the deflection of said thermostatic bar for moving the heater closer to said bar, and means operated by each closing of said main switch for rotating said carrier to bring another of said thermostatic bars into operative position.

5. A manually closeable electric switch, a detent operably associated therewith for holding said switch closed, an electric heater energized by the closing of said switch, a rotary carrier, a plurality of bi-metal thermostatic bars mounted on said carrier, one of said bars being in position relative to said heater to be gradually deflected toward said heater by the heat therefrom, pivotal means engaging said thermostatic bar and operated by the initial deflection of the latter for moving said heater closer to said bar to increase the range of deflection thereof, means operated by a predetermined deflection of said bar for releasing said detent, and means operated by each closing of said switch for rotating said carrier to bring another bar into operative position.

FRANK KUHN.
LAURENCE H. THOMAS.

REFERENCES CITED

The following references are of record in the file of this patent:

UNITED STATES PATENTS

| Number | Name | Date |
| --- | --- | --- |
| 2,007,596 | Burke | July 9, 1935 |
| 2,106,269 | Brosseau et al. | Jan. 25, 1938 |
| 2,132,622 | Ireland | Oct. 11, 1938 |
| 2,145,722 | Hall | Jan. 31, 1939 |
| 2,236,402 | Gomersall | Mar. 25, 1941 |
| 2,403,803 | Kearsley | July 9, 1946 |
| 2,439,017 | Meyers | Apr. 6, 1948 |